United States Patent [19]

Drees

[11] 4,180,367
[45] Dec. 25, 1979

[54] SELF-STARTING WINDMILL ENERGY CONVERSION SYSTEM

[76] Inventor: Herman M. Drees, Box 7, Marstons Mills, Mass. 02648

[21] Appl. No.: 548,435

[22] Filed: Feb. 10, 1975

[51] Int. Cl.² ............................................. F03D 3/06
[52] U.S. Cl. .................................... 416/119; 416/140
[58] Field of Search ................ 416/41, 108, 109, 111, 416/116, 119, 135, 139, 140

[56] References Cited

U.S. PATENT DOCUMENTS

| 177,057 | 5/1876 | Bowes | 416/119 |
|---|---|---|---|
| 1,139,103 | 5/1915 | Clade | 416/119 |
| 1,190,629 | 7/1916 | Clade | 416/108 |
| 1,430,406 | 9/1922 | Schulthes et al. | 416/119 X |
| 1,618,549 | 2/1927 | O'Toole | 416/111 |
| 1,639,908 | 8/1927 | Strandgren | 416/109 |
| 1,753,252 | 4/1930 | Strandgren | 416/108 |
| 1,775,593 | 9/1930 | Kahn | 416/108 |
| 1,835,018 | 12/1931 | Darrieus | 416/119 X |
| 1,880,302 | 10/1932 | Lammeren | 416/109 |
| 1,885,640 | 11/1932 | Strandgren | 416/108 |
| 2,044,794 | 6/1936 | Kisevalter | 416/118 |
| 2,413,460 | 12/1946 | Main | 416/116 X |
| 3,382,931 | 5/1968 | Pontcarral et al. | 416/116 X |
| 3,877,836 | 4/1975 | Tompkins | 416/111 X |
| 3,978,345 | 8/1976 | Bailey | 416/119 X |
| 4,048,947 | 9/1977 | Sicard | 416/119 X |
| 4,052,134 | 10/1977 | Rumsey | 416/119 |

FOREIGN PATENT DOCUMENTS

| 24121 | 10/1936 | Australia | 416/119 |
|---|---|---|---|
| 860930 | 12/1952 | Fed. Rep. of Germany | 416/119 |
| 892130 | 10/1953 | Fed. Rep. of Germany | 416/119 |
| 2051579 | 4/1972 | Fed. Rep. of Germany | 416/119 |
| 502616 | 5/1920 | France | 416/111 |
| 530231 | 12/1921 | France | 416/135 |
| 701036 | 3/1931 | France | 416/139 |
| 822092 | 12/1937 | France | 416/111 |
| 929721 | 1/1948 | France | 416/52 |
| 264219 | 1/1927 | United Kingdom | 416/111 |
| 296736 | 9/1928 | United Kingdom | 416/108 |
| 319963 | 10/1929 | United Kingdom | 416/116 |
| 301091 | 1/1930 | United Kingdom | 416/119 |
| 150066 | 2/1962 | U.S.S.R. | 416/41 |

Primary Examiner—Everette A. Powell, Jr.
Attorney, Agent, or Firm—Robert F. O'Connell

[57] ABSTRACT

A wind turbine apparatus in which a plurality of wind responsive elements are movably mounted, such as by being pivotally mounted, on a movable means which produces rotary motion. The positions of the wind responsive elements are arranged to provide a drag force on at least one of the elements in response to the wind when the speed of rotary motion is below a predetermined level so as to produce a starting force to initiate and maintain the rotary motion. When the speed of the rotary motion exceeds such predetermined level the positions of such wind responsive elements are such that a lift force is provided thereon in response to the wind so that the rotary motion can achieve speeds which are considerably higher than those achieved by the starting force.

15 Claims, 24 Drawing Figures

OPERATING PHASE

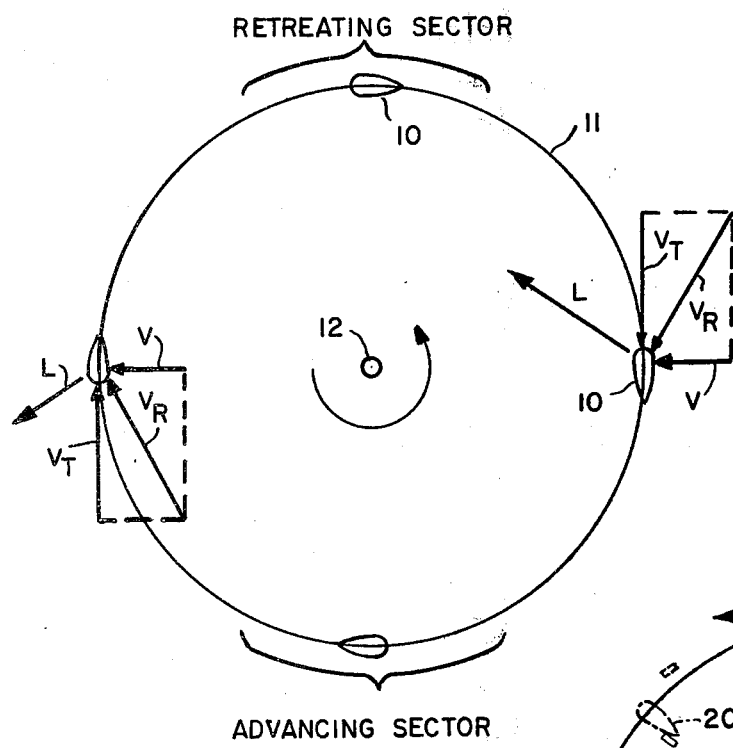
FIG. 1
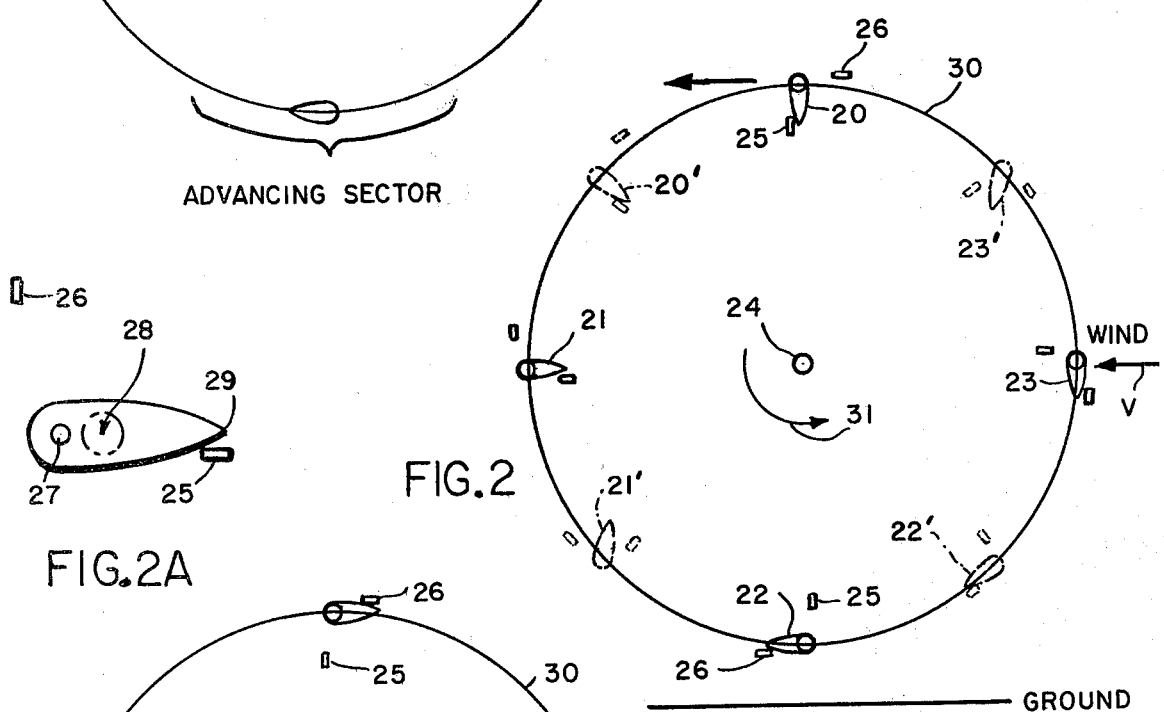
FIG. 2
FIG. 2A
STARTING PHASE
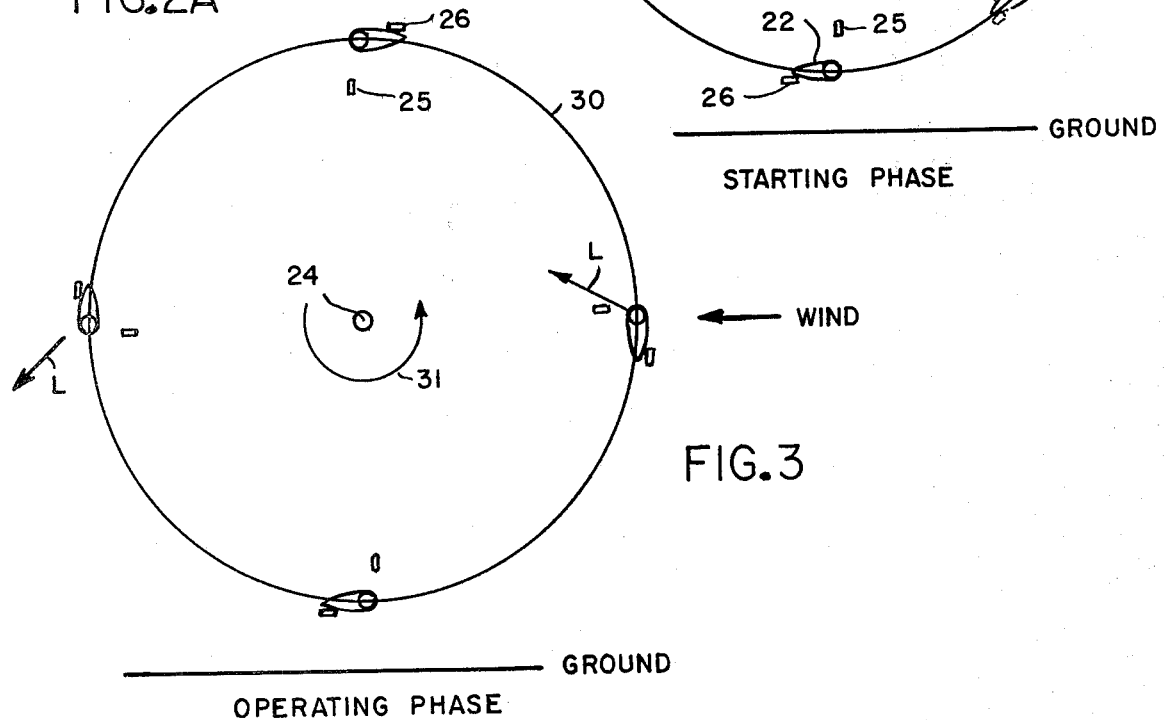
FIG. 3
OPERATING PHASE

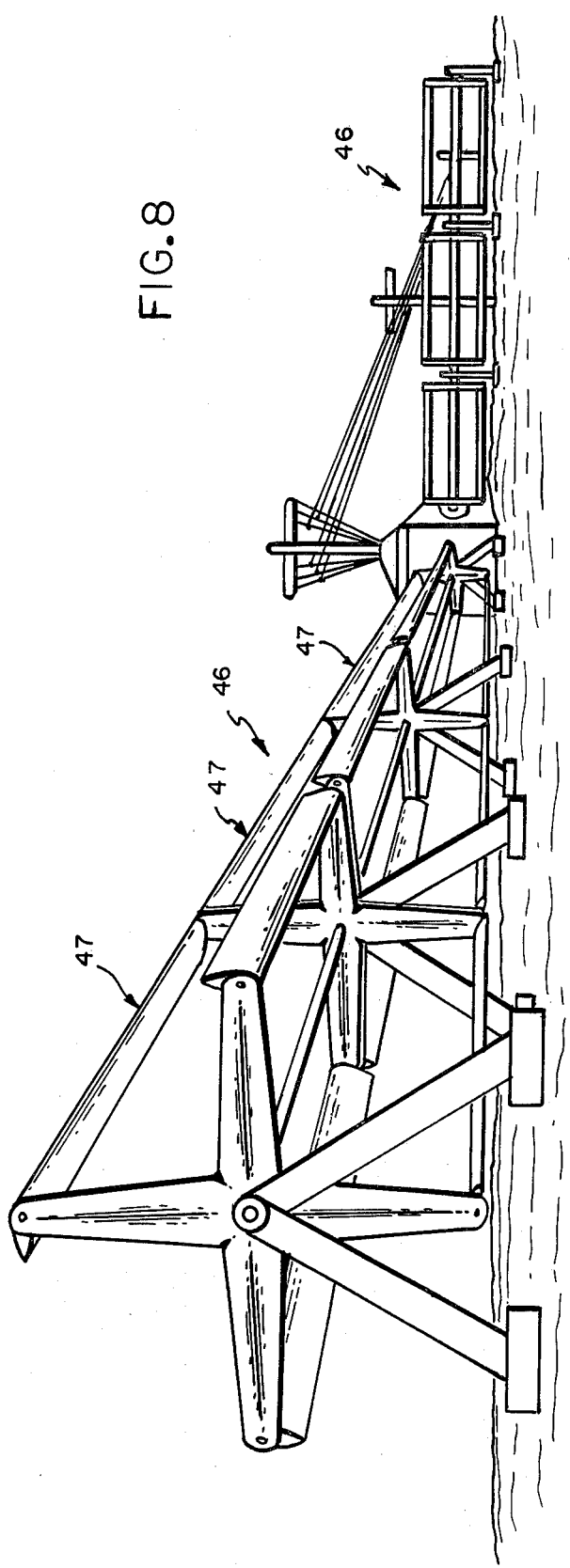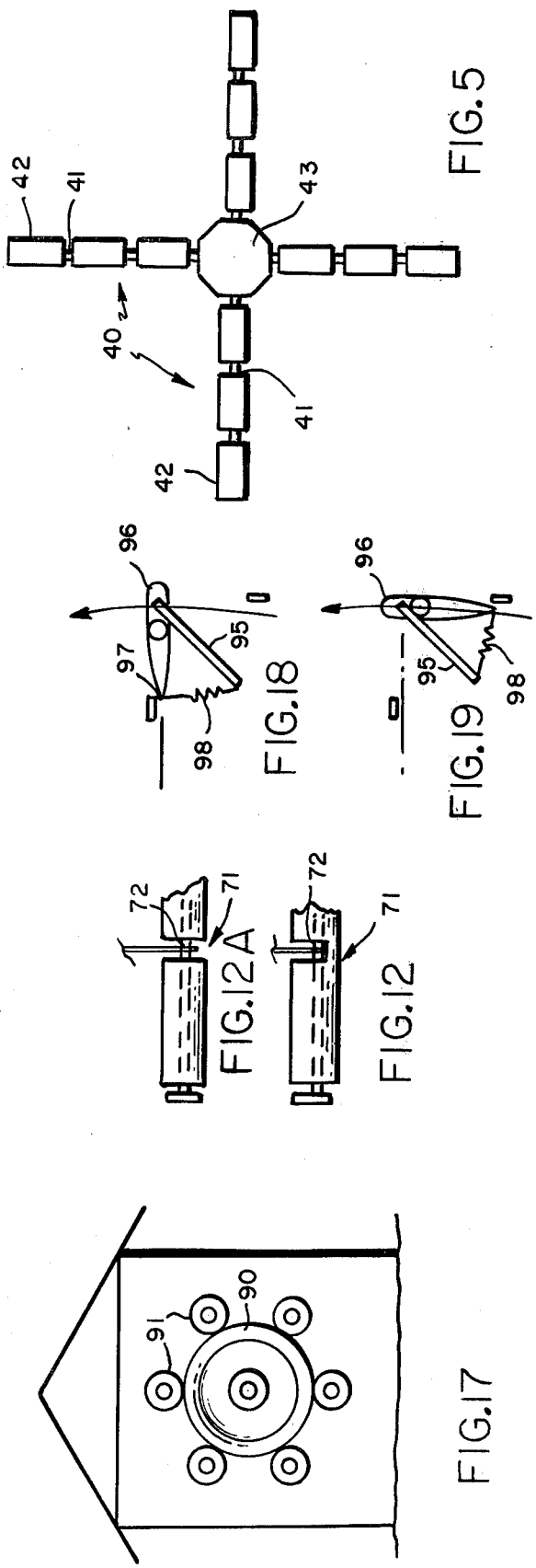

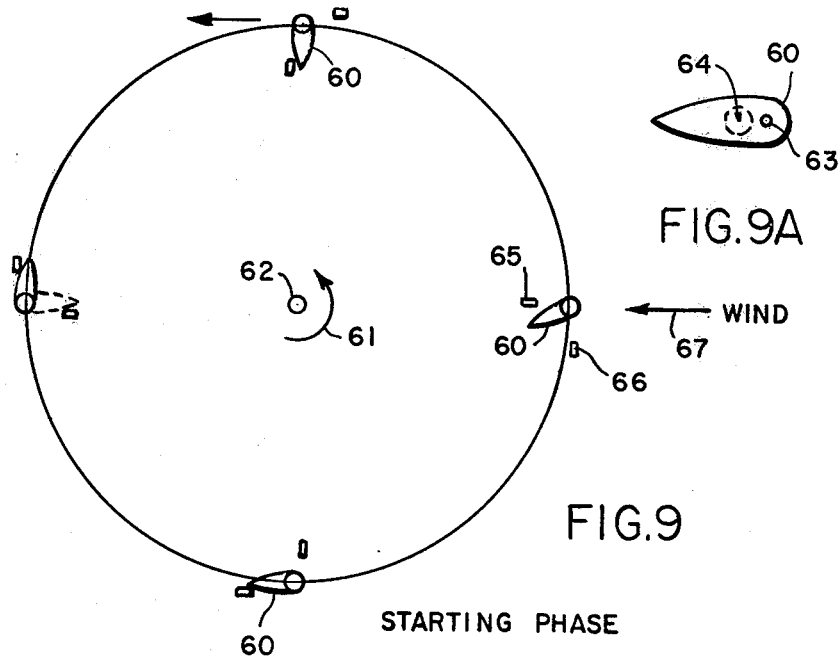
FIG.9A
FIG.9
STARTING PHASE
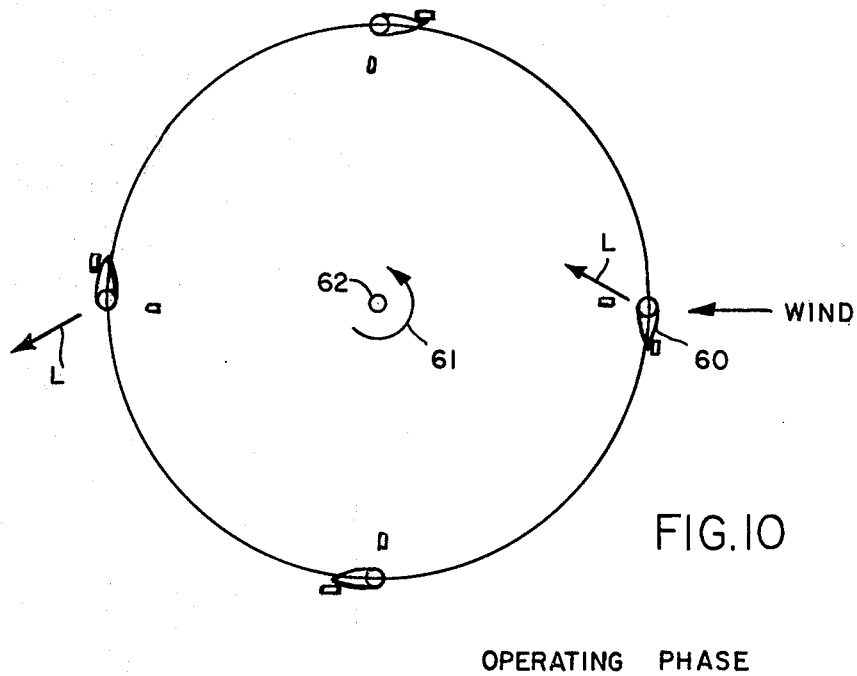
FIG.10
OPERATING PHASE

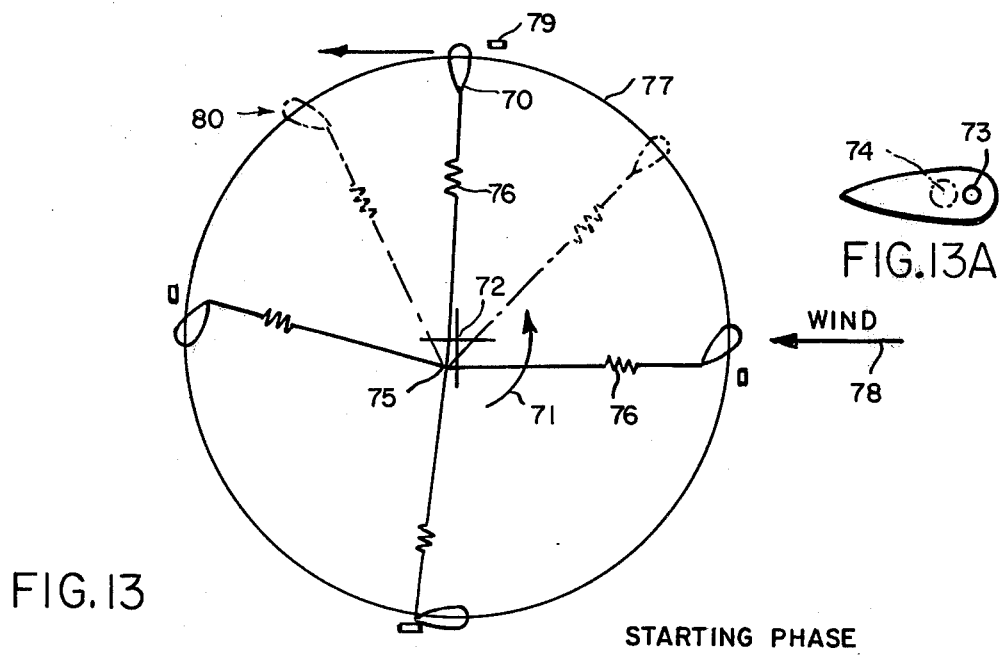
FIG. 13
FIG. 13A
STARTING PHASE
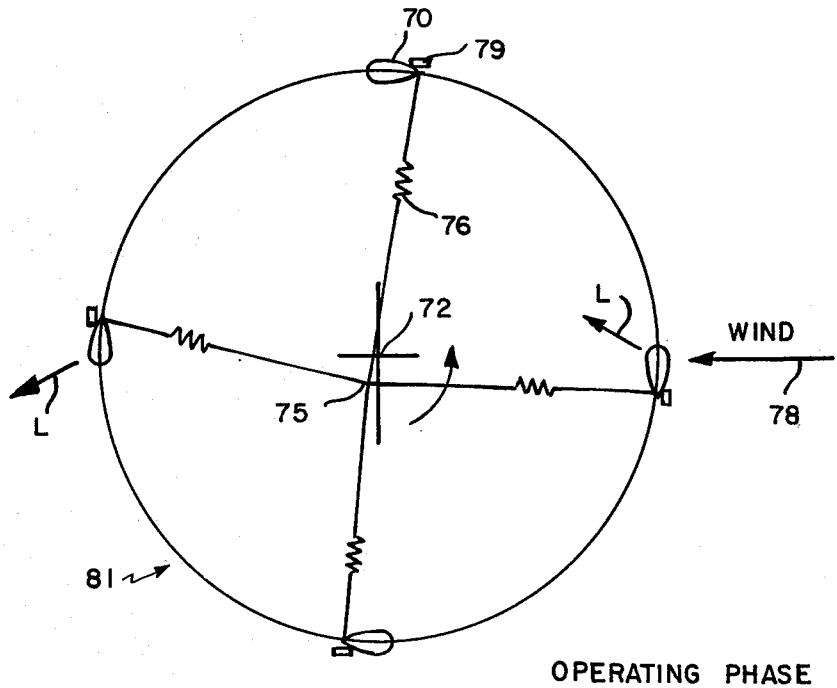
FIG. 14
OPERATING PHASE

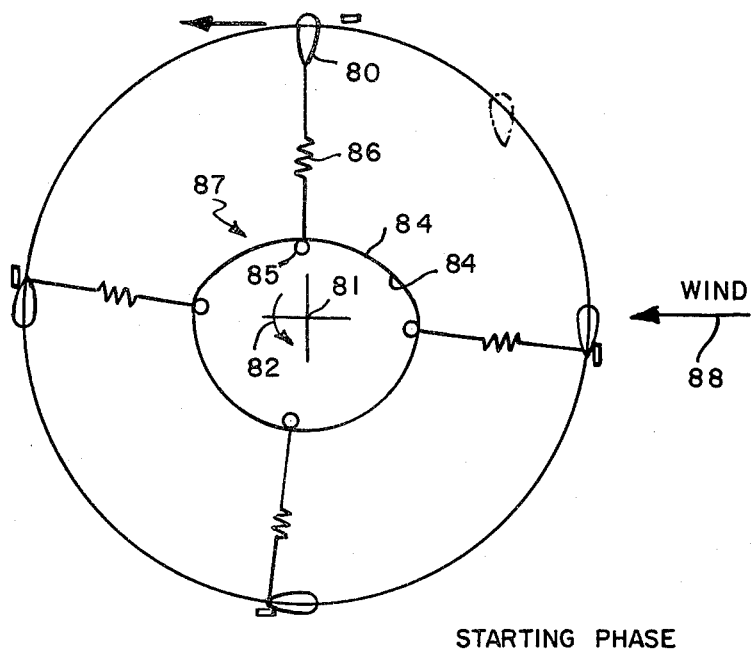
FIG.15  STARTING PHASE
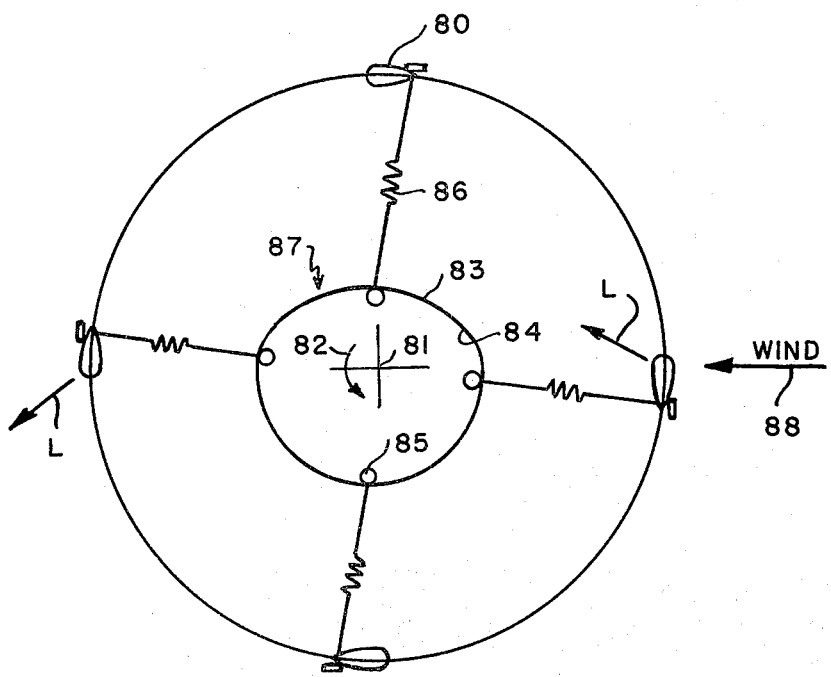
FIG.16  OPERATING PHASE

SELF-STARTING WINDMILL ENERGY CONVERSION SYSTEM

INTRODUCTION

This invention relates generally to energy conversion systems and, more particularly, to wind turbine systems which are designed to be self-starting.

BACKGROUND OF THE INVENTION

Recent concern for new energy conversion devices which can supplement presently available systems using energy sources, such as fossil fuels, which are being rapidly depleted throughout the world have led to the investigation of power sources which have not heretofore been effectively developed. One such power source is that contained in the non-polluting and relatively inexhaustable energy contained in the wind. It is believed that a significant portion of the energy needs in the United States, for example, might be eventually met through the conversion of wind energy to electrical power.

In order that such systems can effectively compete with conventional energy sources so that the investigation and design thereof is worth-while, the costs involved must be commensurate with the power which can be obtained thereby. Recent studies have concluded that the larger the wind energy conversion system the lower the cost of the energy produced. Accordingly, it is desirable that wind turbine structures, if they are to be effectively competitive, be designed so that they can be made large enough to take advantage of such fact.

DESCRIPTION OF THE PRIOR ART

Historically, wind power research has focussed on the development of propeller-type windmills and, although continuing effort is being devoted to such a configuration, there is some doubt that propeller-type structures can be made in the size ranges required for producing effective power at reasonable cost. Furthermore, structural difficulties arise in such devices from the high centrifugal loads to which the relatively long rotor blades of large windmills are subjected.

In an effort to avoid the problems associated with propeller-type windmills, wind-driven apparatus utilizing different structural principles have been suggested. Such devices, often referred to as "wind turbines" in order to distinguish them from propeller-type windmills, utilize turbine blades which are positioned effectively parallel to the rotating shaft of the device. Early wind turbines developed in the Middle East and China and ultimately utilized in the early 19th century in the United States arrange their wind-catching surfaces to move in the direction of the wind so that during operation the only effective driving force therefor is produced by the drag force on the affected surfaces. Such types of machines are sometimes referred to as "panemones".

The main disadvantage of wind turbines operating on the drag force principle is that the moving surface must always move at a velocity less than that of the wind. Accordingly, the speed of revolution is low and relatively extensive gearing is required if a high speed electrical generator is to be driven thereby. An advantage of the panemone type structure, however, lies in its simplicity and its low construction costs.

While development of panemones occurred in the early part of the 20th century, the most significant improvement thereto was made by G. J. M. Darrieus who devised an apparatus wherein the rotor blades were placed in a configuration such that, instead of using the drag force as the driving force, the blade chord is arranged tangent to the path of the blade revolution, as described, for example, in U.S. Pat. No. 1,835,018. By such a configuration Darrieus utilizes the lift forces created on the blades by the result of air velocity caused by the rotational motion in combination with the wind velocity. The Darrieus structure is positioned so that the axis of the rotor thereof is vertical relative to ground and the rotor operates regardless of the wind direction. The blades thereof are relatively thin and flexible and in the preferred Darrieus embodiment are connected to the axis at the ends thereof so as to provide a bowed configuration. Accordingly, during operation the blades tend to assume a natural shape corresponding to the centrifugal and wind loads on them. One of the recognized advantages of the Darrieus rotor structure is that it has a relatively high rotational speed which lends itself well to the direct generation of electricity. Further, a wind turbine of the Darrieus type needs no speed control device inasmuch as the drag force on the advancing rotor blade serves as a brake at high wind velocities.

The primary disadvantage of the Darrieus structure, however, is that its rotational speed must initially be such that the resultant air velocity direction is oriented to an angle near the blade's stall angle. Without such initial conditions the machine will simply not start its operation. In essence, then, the Darrieus wind turbine, since it is not self-starting, requires external means for starting the apparatus, which external means in itself requires input energy and substantially constant monitoring in the event that the wind velocity reduces to such a low value that the apparatus stops.

SUMMARY OF THE INVENTION

The apparatus of the invention is of the wind turbine type and utilizes a configuration which, while it takes advantage of the Darrieus approach, is further designed so as to be self-starting so that no external starting devices or monitoring mechanisms are required. The self-starting mechanism utilizes principles of blade pitch control which provides a suitable balance of forces on the blades so as to meet the requirement for providing an initial rotational speed which permits the wind turbine to begin its rotation on a self-starting basis. In one embodiment, for example, the blade pitch control provides an appropriate balance of the gravitational and centrifugal forces for such purpose.

The self-starting operation is achieved in a preferred embodiment by positioning the blades in a substantially non-bowed manner effectively parallel to the axis of rotation so that their orientation to the wind is such that a drag force is initially imparted to at least one of the blades by the presence of the wind. The drag force drives the turbine from an initially stopped position and produces a rotational motion of a shaft so long as the shaft rotational motion is below a predetermined speed. After the rotational motion has reached such predetermined rotational speed, the blades are oriented so that the wind can then impart a lift force thereto to drive the turbine at rotational speeds higher than those achieved by the drag force present during the starting phase. Thus, for example, the blades are automatically pivoted to a suitable position for lift force operation by means of a centrifugal balance mechanism whereby the centrifugal force on the blades is balanced against a force applied thereto, the latter force being, for example, the gravitational force, the wind force itself, or a suitable spring force, depending on the specific embodiment thereof.

The wind turbine of the invention can be utilized in either a vertical or a horizontal position (or even at an appropriate angle therebetween). In a vertical position the self-starting device operates independently of wind direction for a single turbine structure. In order to take advantage of the gravitational force, however, the turbine can be placed in a horizontal position. In order to assure that appropriate rotational motion is achieved independently of wind direction in such a case, the overall turbine structure includes a plurality of arms each containing serially connected wind turbine members, as described in more detail below.

The details of the invention and specific embodiments thereof can be better understood with the help of the accompanying drawings wherein FIG. 1 shows a diagrammatic representation of the aerodynamic performance of a wind turbine apparatus of the prior art;

FIGS. 2, 2A and 3 show diagrammatic representations of the structure and aerodynamic performance of one embodiment of the invention;

FIG. 5 shows a plan view of another embodiment of the invention utilizing a plurality of devices generally of the type shown in FIG. 4;

FIG. 8 shows a pictorial representation of an embodiment of the invention utilizing a plurality of devices generally of the type shown in FIGS. 6 and 7;

FIGS. 9, 9A and 10 show diagrammatic representations of the structure and aerodynamic performance of another embodiment of the invention;

FIGS. 12 and 12A show pictorial representations of alternative embodiments of a portion of the embodiment of FIG. 11;

FIGS. 13, 13A and 14 show diagrammatic representations of the structure and aerodynamic performance of another embodiment of the invention;

FIGS. 15 and 16 show diagrammatic representations of the structure and aerodynamic performance of another embodiment of the invention;

FIG. 17 shows a portion of an apparatus which utilizes the shaft of a wind turbine apparatus in accordance with the invention for driving a plurality of generators; and FIGS. 18 and 19 show pictorial representations of a portion of an embodiment of the invention for minimizing mechanical stresses on the blades thereof.

Figure 4:
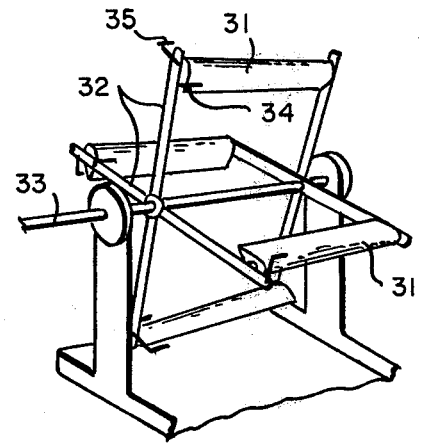
FIG. 4 shows a pictorial representation of one embodiment of the invention utilizing the principles of the aerodynamic performance of FIGS. 2 and 3.

In order to understand the operation of applicant's invention it is helpful to review the aerodynamic performance of a Darrieus type turbine. As shown diagrammatically in FIG. 1 the Darrieus turbine utilizes a plurality of aerodynamically shaped blades 10 which are arranged so that the blade chord is effectively tangent to the circular path 11 of the blade's revolution. As mentioned above, the upper and lower ends of each blade are effectively connected to the ends of the shaft at the center 12 of the overall structure in a manner clearly shown in the above-identified U.S. patents.

Such a configuration utilizes the lift created on the blade, shown by the lift vector L in FIG. 1, which is created by the resultant air velocity, shown by the vector $V_R$, the lift vector being perpendicular thereto. The resultant air velocity is caused by the air velocity due to rotational motion of the device, shown by the vector $V_T$, in combination with the wind velocity, shown by the vector V.

The Darrieus structure must be placed in motion by an appropriate external starting mechanism. Once started, however, its aerodynamic efficiency is relatively high and can be maintained so long as the wind velocity does not fell below a specified level which would cause the Darrieus apparatus to stop.

The invention provides a modified Darrieus type structure which is completely self-starting. During the starting phase the blades are positioned so that the presence of any wind will impart a drag force thereto and the turbine is brought up to a suitable predetermined rotational speed. At such speed the device is then arranged so that the aerodynamic lifting forces, as utilized in a Darrieus structure, take over from the drag forces used in self-starting phase so as to further increase the turbine's rotational speed. The self-starting mechanism is arranged so that it does not hamper the rotor's efficiency once the predetermined rotational speed is reached and exceeded, the self-starting mechanism being in operation only at times when the rotational speed is below such predetermined level.

In order to accomplish the desired self-starting operation the invention makes use of a blade pitch control technique as described in more detail below. In accordance therewith, the blades of the apparatus are subjected to a force which orients at least one of the blades so that its chord is substantially perpendicular to the wind direction in the retreating sector of the blade's revolution during the starting phase of the turbine. In such starting phase, then, the wind imparts a drag force to at least one of the blades which drag force thereupon starts the rotational motion of the turbine. The rotational speed of the turbine continues to increase until it reaches a predetermined speed above which the centrifugal action which is present in the rotating turbine provides a centrifugal force which exceeds the original orienting force on the blades and causes the blades to assume a new pitch orientation such that the wind then imparts a lift force thereto. The blades are then so positioned that the rotational speed of the turbine is sufficiently high that the mechanical energy thereof can be converted to electrical energy in efficient and well-known manner.

In order to accomplish such blade pitch changes the blades are arranged in a relatively rigid and unbowed manner and at least three blades are required to provide a relatively constant starting torque for all the positions in which the blades may have come to rest. While the use of three blades tends to reduce the rotational speed slightly compared to a device which utilizes less than three blades, such slightly lower rotational speed tends to reduce the centrifugal loads to which the blades are subjected and helps to prevent damage thereto.

One embodiment of a self-starting turbine system in accordance with the above discussed principles of the invention is shown diagrammatically in FIGS. 2 and 3.

As can be seen therein, the turbine axis 24 is placed in a position substantially horizontal with respect to the ground. The use of a horizontally oriented turbine structure permits gravity to be used as the initial orienting force for controlling the pitch of the blades at the beginning of and during the starting phase.

In the particular embodiment depicted in FIGS. 2 and 3 the apparatus is shown as utilizing four blades 20, 21, 22 and 23, which rotate about an axis 24. Each blade has associated therewith a pair of stop members 25 and 26 which permit each blade to rotate about a pivot point 27 therebetween, the first point being such that the center of gravity 28 is located aft thereof (i.e., between the pivot point 27 and the trailing edge 29 of the blade).

During the starting phase as shown in FIG. 2 topmost blade 20, for example, will be automatically forced into the vertical orientation shown due to the force of gravity acting thereon. The lower blade 22, for example, will be effectively in its feathered position since it comes to rest against its associated stop member 26. In this manner, advantage is taken of the wind velocity V above the ground, the wind velocity being assumed to lie in the direction shown.

During the starting phase, so long as the wind velocity is greater than zero, any blades in the retreating sector of the turbine, i.e., the upper half of the circular rotating path 30 shown in FIGS. 2 and 3 (e.g., blade 20 in FIG. 2), are presented to the wind in the panemone configuration so that rotation of the turbine begins in the direction of arrow 31. Blades in the advancing sector, i.e., the lower half of the circular path (e.g., blade 22 in FIG. 2), are feathered. It can be seen from an examination of FIG. 2 that at least one blade would be presented to the wind in a substantial panemone configuration so that initial rotation of the device would always commence because of the gravity force which appropriately orients the blades in the retreating sector. Intermediate positions of the blades as shown in phantom by blades 20', 21', 22' and 23' can be visualized to confirm that fact.

The turbine thereby starts its rotation and ultimately reaches a rotational speed such that the centrifugal force acting on the centers of gravity aft of each blade's pivot point will increase to a point where it balances the gravitational force thereon and overrides such gravitational force so as to pull each of the blades adjacent their associated stop members 26 as shown in the operational phase depicted in FIG. 3. As seen therein, the blades are then subject to a lift force due to the wind and the turbine continues to rotate at appropriately high speeds as a result. The change of pitch of the blades, thus, occurs when the rotational speed reaches a predetermined level such that a balance of forces occurs whereby the position of the blade's pivot axis relative to the center of gravity causes the centrifugal force to dominate the gravitational force.

A specific structure utilizing the principles of the diagrammatic structure shown in FIGS. 2 and 3 is shown in FIG. 4. The structure shown therein utilizes four streamlined airfoil blades 31 which are pivotally attached at their ends to an armature frame 32 which transmits the forces thereon to provide a rotational force on shaft 33. The shaft is mounted on an appropriate pair of bearings which are bolted to a support structure. A pair of stop members 34 and 35 associated with each of the blades 31 are suitably attached to the armature frame to guide the blades to their correct pitch positions. The structure shown in FIG. 4 produces a shaft rotational speed during the starting phase which ultimately reaches a predetermined level at which the centrifugal force balances the gravitational force so that the apparatus shifts from its starting phase to its operating phase where it continues to rotate at high speeds the levels of which depend on the amplitude of the wind velocity.

As shown in the specific embodiments of FIGS. 2 and 3 the blade cross-sections each have a streamlined configuration which as used herein means that such blades offer minimum resistance to forward movement and are capable of converting into mechanical energy the maximum available amount of energy of a fluid, e.g., the air, by means of the useful component of the transverse thrust which the section undergoes. While such a streamlined configuration is preferred in the embodiment of FIGS. 2 and 3, the configuration may alternatively be in a substantially elliptical shape as discussed below so that minimal resistance to forward movement is achieved for bi-direction operation of the turbine.

The use of a horizontal configuration as shown in FIG. 4 lends itself to the arrangement of a plurality of such devices effectively in a serial form so that relatively large wind power stations can be built. Thus, a plurality thereof may be connected onto a single shaft which is suitably supported so as to feed into an appropriate generator housing wherein the rotary mechanical motion of the shaft is converted into electrical energy by conventional generator means. In order to assure that such a structure will always be appropriately oriented with respect to the wind direction, more than one of said shafts, each having a plurality of such devices serially connected thereto, can be arranged at suitable angles with respect to each other such that at least one set of turbines is positioned correctly for operation.

One appropriate manner for arranging such devices is shown in FIG. 5 wherein a plurality of arms 40, each containing a single shaft 41 and a series of turbines 42 associated therewith, extend radially outwardly from a common generator station 43. In the specific embodiment shown, four such arms are arranged at right angles to each other. The generator may be suitably connected to the shafts of each arm via a well-known free wheeling technique so that only the fastest rotating shaft will drive the generator at any one time. Each of the turbines 42 on each of the shafts 41 operates in the manner discussed above with reference to FIGS. 2 and 3 and the overall structure can be made relatively large so that relatively large amounts of power are generated.

Figure 6:
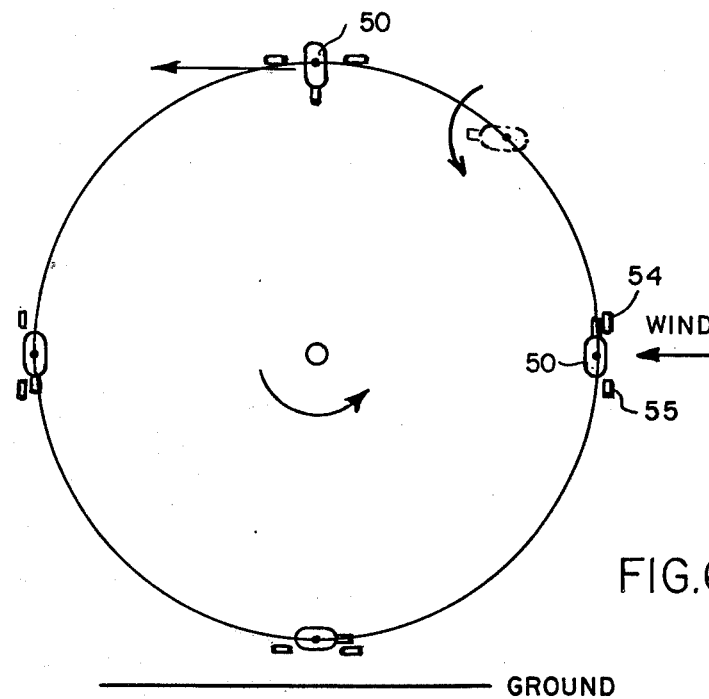
FIGS. 6, 6A and 7 show diagrammatic representations of the structure and aerodynamic performance of another embodiment of the invention.
Figure 6A:
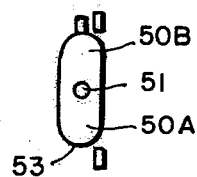
Figure 7:
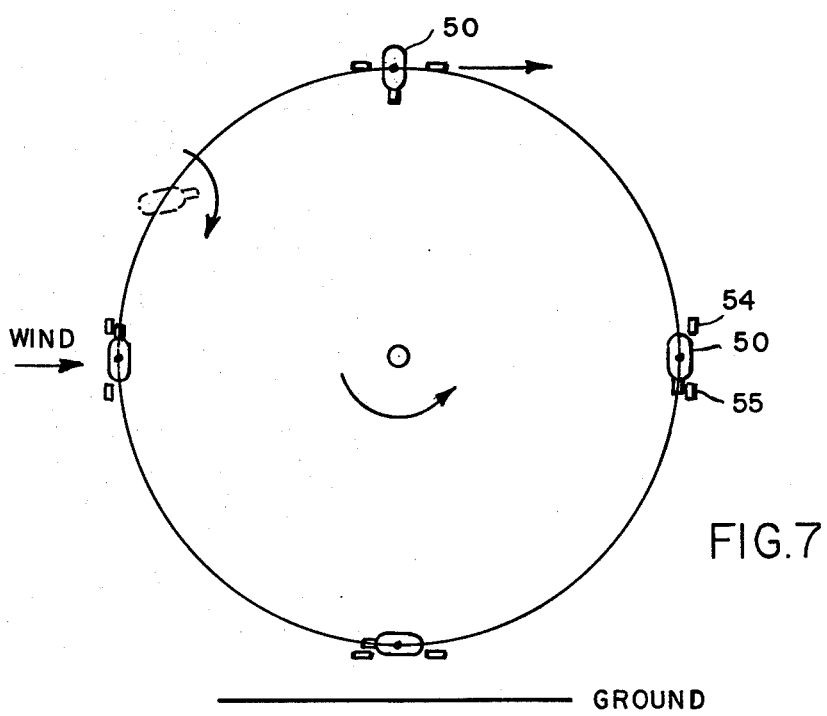

While a minimum of four arms would be needed in order to obtain operation of at least one set of turbines along any one arm independent of wind direction, where each turbine operates in accordance with the structure of FIGS. 2 and 3 in which the rotational motion is in one directly only, it is possible to reduce the number of arms needed if each turbine is capable of rotation in both directions. As shown in FIGS. 6 and 7, such a bi-directional structure can be achieved by using a substantially elliptical blade configuration rather than the more standard streamline shape shown in FIGS. 2 and 3. The blades 50 are arranged to pivot at the center of their chord, as shown by pivot points 51, and one end region of each of the blades, e.g., end regions 50A, is made heavier than the opposite end region 50B so that the centers of gravity 52 thereof lie between the pivot points 51 and the ends 53 of each blade so as to supply the pitching moment needed to present the blade in a substantially perpendicular orientation to the wind in the retreating sector during the starting phase, as discussed above with reference to FIGS. 2 and 3. In FIGS. 6 and 7 stop members 54 and 55 are required. During the starting phase, the blades in the retreating sector will be vertical and no matter what the direction the wind velocity assumes, a component thereof will provide a drag force thereon. Accordingly, the turbine will rotate in either direction depending on the wind direction.

The use of a turbine device as in FIGS. 6 and 7 avoids the necessity for utilizing more than two arms in the configuration of FIG. 5. Inasmuch as the turbines will rotate in either direction about their shafts, two perpendicularly oriented arms will be sufficient to provide operation of at least one turbine group independent of wind direction.

In order to provide some idea of the size of the turbine structures which may be involved in particular applications, a pictorial view of an appropriate structure is shown in FIG. 8 which structure utilizes two arms 46 arranged perpendicular to each other, each arm containing three turbine structures 47 of the type discussed above. Such structures may extend from 50 to 100 feet or more, in length and from 25 to 50 feet, or more, in height, depending on the application and the site on which such structure is located. As many turbine units can be placed on the same shaft as may be necessary to meet particular desired power requirements and no theoretical limit need be placed thereon so long as sufficient land, which is preferably relatively flat, is available.

Although the structures of FIGS. 2 and 3 or 6 and 7 are useful in providing apparatus which takes advantage of gravitational forces to provide blade pitch control in order to achieve self-starting operation when the turbines are oriented in a horizontal direction, it is possible to construct an apparatus in accordance with the principles of the invention when the turbine blades are vertically oriented. In such cases the force required to appropriately position the blades for self-starting operation can be achieved by utilizing the wind itself or by utilizing other mechanical forces, such as spring forces, in the manner discussed below with reference to the additional embodiments of FIGS. 9-14.

For example, a diagrammatic representation of a vertical structure is depicted in its starting phase in FIG. 9 and in its operating phase in FIG. 10. Thus, turbine blades 60 having, for example, a streamlined configuration are mounted so as to provide rotational motion in the direction of arrow 61 about a shaft position 62, the shaft being arranged to be mounted perpendicularly to the ground (not shown). The pivot points 63 of blades 60 are mounted forward of the center of gravity points 64 of each of the blades and a pair of stop members 65 and 66 are associated with each of said blades. In a manner similar to that discussed above with reference to gravity systems the wind itself can be utilized as the force which maintains the position of the blades in the retreating sector in their appropriate panemone positions so as to provide a starting rotation due to drag forces thereon. Thus, the uppermost blade 60 in the configuration shown in FIG. 9 is held against stop member 65 by a wind which is assumed as having a component in the direction shown by arrow 67. Accordingly, so long as such wind component is greater than zero, the apparatus will rotate in the direction of arrow 61 until predetermined rotational speed is achieved, at which point the centrifugal forces on the blades are sufficient to overcome the force provided by the wind and the blades effectively assume the positions shown in FIG. 10. Thus, below such predetermined rotational speed, during the starting phase, the blades are feathered in the advancing sector and are presented to the wind in the panemone configuration in the retreating sector, while in the operating phase above such predetermined rotational speed they are in a position such as to provide a rotational motion due to lift forces acting thereon.

While the structure in FIGS. 9 and 10 operates to rotate in the direction of arrow 61, so long as a component of wind is in the direction of arrow 67, the device can be made to rotate in both directions so that operation is completely independent of wind direction by utilizing the elliptical blade structures shown in FIGS. 6 and 7 in a manner discussed above with reference thereto.

Figure 11:
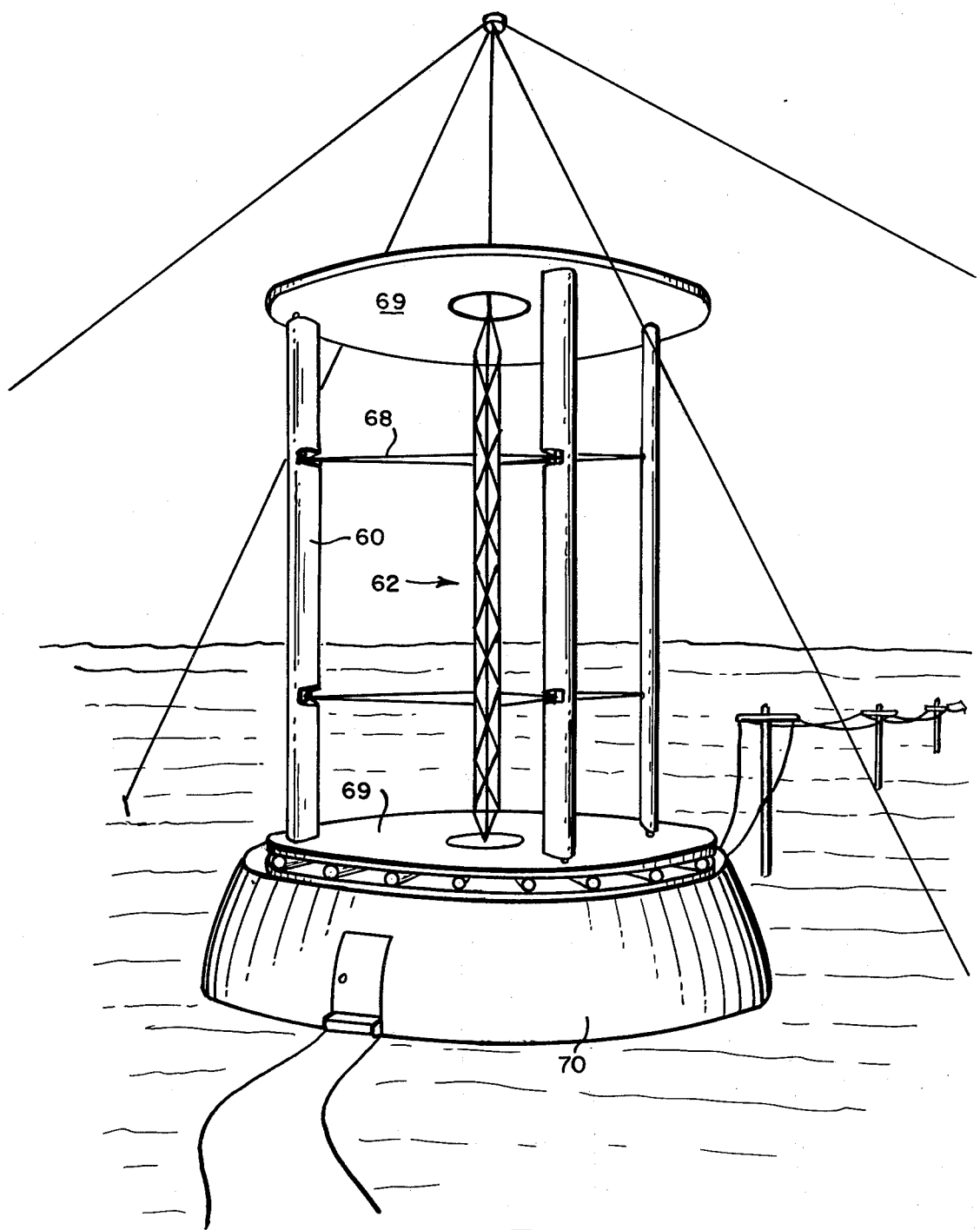
FIG. 11 shows a pictorial representation of an embodiment of the invention utilizing a device generally of the type shown in FIGS. 9 and 10.

A pictorial representation of a vertically oriented structure is shown in FIG. 11 and provides some idea of the potential size range which might be involved. As seen therein, the blades 60 are mounted vertically and are held in such vertical orientation so as to prevent their bowing by the use of wire braces 68, for example, as shown and discussed more fully below. The pivoting shafts of each of the blades are connected at their ends to appropriate platform frames 69, the lower platform being mounted on a plurality of bearings to permit rotational motion of the overall frame structure so that the shaft 62 is rotated to provide appropriate mechanical motion for conversion to electrical energy in generator housing 70. Stop members are appropriately mounted as desired on the platforms 69.

As mentioned above, the shafts 62 may be subjected to such forces during rotation, particularly at high speeds, that they may bow outwardly in an undesired manner. In order to counteract such an effect, they may be made of sufficiently strong material to avoid such action. In relatively large structures it may not be possible to make the shaft strong enough to withstand such action and other appropriate means may be used to prevent the bowing thereof. One such technique is shown in FIG. 10 wherein wire braces 68 are connected from the blades to the shaft at various points along their lengths. In order to permit appropriate pivotal action of the blades the wire braces may be attached at their blade ends as shown in FIGS. 12 and 12A.

As seen therein, a portion of the blade is removed at a region 71 thereof and the wire brace essentially attached to the pivot point 72 of the blade. For example, if substantially half of the blade cross-section is removed as shown at region 71, the blade will still be permitted to move between its two stop members (i.e., effectively through about a 90° angle) without hindrance during operation of the device, as required, for example, in the configuration of FIGS. 2 and 3.

If pivotal motion of the blade through an angle greater than 90° is required, as in the bi-directional configuration of FIGS. 6 and 7, for example, the entire portion of the blade at region 71 may be removed and the wire brace attached to the pivot point 72, as above. Such a structure will permit pivotal motion of the blade between its two stop members (i.e., effectively through about a 180° angle) without hindrance during operation. Other appropriate means for preventing a bowing of the blade shafts during operation may be used.

An alternative structure for controlling the pitch of the blades to permit appropriate self-starting is shown in FIGS. 13 and 14 wherein blade pitch is controlled through the use of an auxiliary shaft 75 which is displaced from the main shaft 72. As shown therein a plurality of blades 70 are mounted so as to provide rotational motion in the direction of arrow 71 about shaft 72. The blades are each mounted at a pivot point 73 forward of the center of gravity 74 thereof. The auxiliary shaft 75 displaced from shaft 72 has connected to it one end of each of a plurality of spring-loaded pull rods 76, the other ends of which are each attached to the trailing edges of blades 70. Pull rods 76 are used to transmit a force which pulls the trailing edge of the blade toward the displaced shaft 75 in the retreating sector of circular path 77. The topmost blade 70, for example, in FIG. 13 is held in the position shown so as to be in a panemone orientation with respect to a component of the wind velocity in the direction shown by arrow 78 to permit the initiation of rotation due to the drag force arising thereby during the starting phase. When a predetermined rotational speed of shaft 72 is reached, the centrifugal force on the blade's chordwise center of gravity forces the blades into the positions shown in FIG. 14 determined by the stop member 79 to permit rotation due to the lift forces on such blades during the operational phase. As shown in FIG. 13, during the starting phase the spring-loaded pull rods 76 are in their relaxed positions except for the pull rods in the upper region 80 of the retreating sector, while during the operational phase as shown in FIG. 14 the pull rods are in their relaxed status only during the lower region 81 of the advancing sector. Accordingly, the same effective operation as discussed above with reference to FIGS. 2 and 3, for example, is achieved.

In order to achieve appropriate starting operation, the system of FIGS. 13 and 14 must be oriented so that at least a component of the wind is in the direction of arrow 78 as shown. Such orientation can be achieved by connecting the displaced shaft to a weather vaning device which can be used appropriately to control the orientation of the device until starting occurs. Once the turbine is in its operating phase, a change in the wind direction has no effect on the performance of the overall structure when it is vertically mounted.

An alternate structure for performing a similar operation to that described in FIGS. 13 and 14 is shown in FIGS. 15 and 16 in which control of the pitch of the blades occurs through the use of a cam and spring-loaded rod arrangement. As seen therein, a plurality of blades 80 are mounted as discussed above so as to provide a rotating motion of a shaft 81 in the direction of arrow 82. A cam 83 fixedly mounted to shaft 81 has an inner cam surface 84 and a plurality of bearing components 85 which ride upon such surface as shown. A plurality of spring loaded pull rods 86 are connected at one end to such bearing components and at the other end to the trailing edges of blades 80 in the manner depicted. The cam 83 is oriented such that the flat side 87 of surface 84 will displace the pull rods moving therealong so as to pull the trailing edge of the blade attached thereto toward the axis of shaft 81 in the retreating sector as shown with reference to the topmost blade in FIG. 15.

Accordingly, as discussed above with reference to previous embodiments, the blades are in a position so as to provide a starting action so long as a component of wind is in the direction of arrow 88 by means of a drag force imparted to the blade. When the rotating shaft reaches a predetermined rotational speed, the centrifugal force on each blade's chordwise center of gravity forward of the blade's pivot point forces each blade to the positions shown during the operating phase of FIG. 16 so that the device operates effectively in the manner discussed above with reference to FIGS. 13 and 14, for example.

In either of the spring-loaded embodiments, utilizing a displaced shaft or a cam mechanism, the blades may have substantially elliptical configurations so that the overall device can operate in either rotational direction in accordance with the principles discussed above. As mentioned above, the use of rigid blades subjects them to centrifugal forces, particularly at relatively high rotational speeds, which may require that the blades be braced at one or more points along their lengths as discussed above. Reduction of the centrifugal loads can occur by reducing the high rotational speeds to which the blades are subjected and one technique for bringing about such a reduction would be to utilize additional blades so as to increase the inertia of the overall system. While the aerodynamic efficiency would be sacrificed by the use of such additional blades, the reduced efficiency may be counteracted by simply adding more turbine units to the series thereof in the arms of a large power station, as discussed above.

If the speed of rotation of a particular turbine is too slow for a single large generator connected to its shaft, it may be possible to utilize a number of smaller generators placed around the periphery of the device as shown, for example, in FIG. 17. As seen therein, the inner end of the turbine structure has a suitable friction wheel 90, the peripheral motion of which is transmitted to a plurality of generators via separate friction wheels 91 attached to the shafts thereof. The rotation of the large turbine friction wheel 90 causes each of the smaller friction wheels 91 to rotate at higher speeds than the main turbine wheel 90 so that the speed of the generator shafts attached to each of the former wheels will produce sufficient speeds to provide effective generator action.

In some applications the blades may be subjected to relatively high stresses as they change pitch and a suitable shock absorbing device may be required to minimize such stresses. One embodiment of such a device is shown in FIGS. 18 and 19 which illustrate a suitable shock absorbing device as it might be used with a particular blade of one of the embodiments discussed above.

As seen therein, a rigid arm 95 is fixedly attached at one end to the pivot point of a blade 96. The other end thereof is attached to the trailing edge 97 of the blade via a spring mechanism 98 which operates as a shock absorber, as shown. Thus, as the blade changes pitch from a horizontal position shown in FIG. 18 to a vertical position shown in FIG. 19, the stress to which the blade is subjected by such motion is minimized by the shock absorbing spring device. While the device is diagrammatically shown as a spring mechanism, such mechanism may alternatively be in the form of conventionally known pneumatic or hydraulic devices.

While the above embodiments have been shown as practical techniques for utilizing the principles of the invention, other embodiments may occur to those skilled in the art within the spirit and scope of the invention and, hence, the invention is not to be construed as limited to the specific embodiments shown except as defined by the appended claims.

What is claimed is:

1. A wind turbine apparatus comprising movable means for producing rotary motion;

a plurality of air-foil shaped wind responsive elements pivotally mounted on said movable means for exposure to the wind, each said responsive element having a wind responsive surface at least a portion of which is substantially parallel to said rotary motion;

means for maintaining said wind responsive elements at pivotal positions such as to provide a drag force in one direction on a wind responsive surface of at least one of said elements in response to said wind when the speed of said rotary motion is below a predetermined level and to prevent the imposition of a drag force in a different direction on the others of said elements, the drag force in said one direction thereby providing a driving force for said movable means to produce said rotary motion below said predetermined level; and means for maintaining said wind responsive elements at pivotal positions such as to provide a substantial lift force in said one direction on a wind responsive surface of at least one of said elements in response to said wind when the speed of said rotary motion is above said predetermined level, the lift force in said one direction thereby providing a driving force for said movable means to produce said rotary motion above said predetermined level.

2. A wind turbine apparatus comprising
at least one rotating shaft;
at least one frame fixedly attached to said shaft so that movement of said frame causes rotational movement of said shaft along an axis substantially perpendicular to the direction of the wind;
a plurality of air-foil shaped wind responsive elements pivotally mounted on said frame, for exposure to the wind, at least a portion of each of said wind responsive elements being capable of pivoting about an axis substantially parallel to said shaft;

means for maintaining the pivoting portions of said elements at pivotal positions such as to provide a drag force in one direction on at least one of said pivoting elements in response to said wind when the rotational speed of said shaft is below a predetermined level and to prevent the imposition of a drag force in a different direction on the others of said elements the drag force in said one direction thereby providing a starting force for moving said frame so as to start and thereupon to maintain the rotation of said shaft when said shaft speed is less than said predetermined level so long as the wind speed is greater than zero; and means for maintaining the pivoting portions of said elements at pivotal positions such as to provide a substantial lift force in said one direction on at least one of said pivoting elements in response to said wind when the speed of said shaft exceeds said predetermined level, the lift force in said one direction thereby providing a force for rotating said shaft at speeds higher than those achieved by said starting force.

3. A wind turbine apparatus in accordance with claim 2 and further including
means for mounting said shaft and frame so that said shaft and said wind responsive elements are approximately horizontal with respect to the ground; and further wherein
the pivotal positions of said elements which provide said drag force when the rotational speed of said shaft is below said predetermined level are due to gravitational forces; and
the pivotal positions of said elements which provide said lift forces are due to the centrifugal forces thereon which are greater than the grvitational forces thereon when said shaft rotational speed exceeds said predetermined level.

4. A wind turbine apparatus in accordance with claim 3 and further including
a pair of stop members mounted on said frame in association with each of said wind responsive element, one of said stop members retaining said at least one element in a position which provides a drag force thereon in response to said wind during said starting phase and the other of said stop members retaining said at least one element in a position which provides a lift force thereon in response to said wind during said operational phase.

5. A wind turbine apparatus in accordance with claim 4 wherein
said wind responsive elements are in the shape of streamlined airfoils, the pivot points thereof being located aft of the centers of gravity thereof.

6. A wind turbine apparatus in accordance with claim 4 wherein
said wind responsive elements are in the shape of ellipsoid airfoils which are weighted so that the centers of gravity thereof are off-center in one direction and the pivot points of which are located off-center in the opposite direction.

7. A wind turbine apparatus in accordance with claim 3 wherein said apparatus includes
a plurality of said frames each with a plurality of said wind responsive elements mounted thereon, said frames being fixedly attached in serial fashion to said at least one rotating shaft.

8. A wind turbine apparatus in accordance with claim 3 and further wherein said apparatus includes
a plurality of said rotating shafts, each of said shafts having a plurality of said frames fixedly attached thereto in serial fashion, each frame having a plurality of said wind responsive elements mounted thereon,
said plurality of said rotating shafts each being mounted so that said shaft and said wind responsive elements are approximately parallel to the ground,
a common generator station;
each of said shafts being connected at one end to said common generator station and extending radially therefrom at selected angles with respect to one another.

9. A wind turbine apparatus in accordance with claim 8 wherein said plurality of shafts includes at least two of said shafts extending radially substantially at right angles with respect to each other.

10. A wind turbine apparatus in accordance with claim 9 wherein said plurality of shafts includes four of said shafts extending radially substantially at right angles to one another.

11. A wind turbine apparatus in accordance with claim 2 and further including
means for mounting said shaft and frame so that said shaft and said wind-responsive elements are approximately vertical with respect to the ground.

12. A wind turbine apparatus in accordance with claim 11 and further including
means for maintaining at least one of said elements at a first position against the force of said wind at an orientation such as to provide said drag force when said wind speed is below a predetermined level; and means for maintaining at least one of said elements at a second position against the centrifugal forces thereon when said centrifugal forces are greater than said wind forces thereon, said at least one of said elements being maintained at an orientation such as to provide said lift force when said wind speed exceeds said predetermined level.

13. A wind turbine apparatus in accordance with claim 11 and further including force-providing means connected to said wind-responsive elements for maintaining the pivotal positions thereof so as to provide a drag force on at least one of said elements when said wind speed is below said predetermined level and for maintaining the pivotal positions thereof so as to provide a lift force on at least one of said elements when said wind speed exceeds said predetermined level.

14. A wind turbine apparatus in accordance with claim 13 wherein said pivotal position maintaining means comprises an auxiliary shaft mounted parallel to and off-set from said rotating shaft;

a plurality of spring loaded means, each attached at one end to said auxiliary shaft and at the other end to one of said plurality of wind-responsive means so that at least one of said elements is maintained in a pivotal position on said frame during said starting phase so as to provide a drag force thereon in response to said wind, the centrifugal force on said elements being greater than the force of said spring-loaded means thereon so that the pivotal position of at least said elements is maintained so as to provide said lift force thereon during said operational phase.

15. A wind turbine apparatus in accordance with claim 13 wherein said pivotal position maintaining means comprises a cam member having a bearing cam surface fixedly attached to said rotary shaft, a plurality of bearing members arranged for movable contact on said bearing cam surface;

spring-loaded means for connecting each of said bearing members to one of said plurality of wind-responsive elements;

said bearing cam surface being formed so that during said starting phase the pivotal position of at least one of said wind-responsive elements is maintained so as to provide a drag force thereon in response to the wind, the centrifugal force on said elements being greater than the force of said spring-loaded means thereon so that the pivotal position of at least one of said elements is maintained so as to provide said lift force thereon during said operational phase.

* * * * *